United States Patent [19]

Hyndman et al.

[11] Patent Number: 5,141,683
[45] Date of Patent: Aug. 25, 1992

[54] METHOD OF PRODUCING REINFORCED MATERIALS

[75] Inventors: Christopher P. Hyndman; Gordon L. Allen, both of Rugby, England

[73] Assignee: T&N Technology Limited, Rugby, England

[21] Appl. No.: 467,261

[22] Filed: Jan. 19, 1990

[30] Foreign Application Priority Data

Jan. 31, 1989 [GB] United Kingdom ............... 8902050

[51] Int. Cl.⁵ .................... B29C 65/00; C04B 40/00
[52] U.S. Cl. ............................ 264/44; 264/60; 264/63; 264/82; 427/287; 427/314; 427/318; 427/443.2
[58] Field of Search ............ 264/44, 60, 63, 82; 501/80, 88, 97; 427/287, 314, 318, 443.2

[56] References Cited

U.S. PATENT DOCUMENTS

| | | | |
|---|---|---|---|
| 3,947,550 | 3/1976 | Fitchmun | 264/44 |
| 4,579,699 | 4/1986 | Verzemnieks | 264/43 |
| 4,604,249 | 8/1986 | Luhleich et al. | 264/63 |
| 4,610,726 | 9/1986 | King | 204/242 |
| 4,892,693 | 1/1990 | Perrotta et al. | 264/108 |
| 4,929,406 | 5/1990 | Abe et al. | 264/45.5 |

OTHER PUBLICATIONS

Brady & Clauser, *Materials Handbook* (12th Ed.) (1986).

*Primary Examiner*—James Lowe
*Assistant Examiner*—Christopher A. Fiorilla
*Attorney, Agent, or Firm*—William R. Hinds

[57] ABSTRACT

A method is described for the production of a porous ceramic body and the subsequent infiltration of the body with a molten metal to produce an article having a reinforced metallic matrix. The article may be further worked by known techniques such as extrusion or forging, for example.

10 Claims, No Drawings

METHOD OF PRODUCING REINFORCED MATERIALS

The present invention relates to a porous ceramic body comprising particulate or short fibre material and, to a method for the manufacture of such a body. The invention further relates tot eh infiltration of the porous body with a metallic matrix to produce a reinforced composite material.

Advantageous mechanical and thermal properties may be produced in materials having a metallic matrix and containing particles or fibres of ceramic material. Known methods for the production of such materials include that known as mechanical alloying of powders, other methods including those based on powder metallurgy, metal spraying techniques and slurry casting are also known.

According to a first aspect of the present invention a method for the production of a porous ceramic body comprises the steps of mixing a desired proportion of a particulate or short fibre ceramic reinforcing agent precursor material with a desire proportion of a fugitive filler material, a fugitive first binder material and a second binder material, filling a mould with a mixture of the materials, drying for a period of time at less than 100° C., heating to burn off the fugitive filler material and at least to form inter particle bonds with said second binder material.

In one embodiment of the present invention the reinforcing agent may be silicon carbide in particulate form whilst the precursor material may be silicon particles. The silicon particles may be converted to silicon carbide during manufacture of the porous body. Where a precursor of silicon is converted to silicon carbide or silicon nitride, the heating step subsequent to drying may be carried out under controlled atmospheres.

Prior to conversion of a precursor material to the reinforcing agent and after the fugitive filler material has been burnt off, the body may be machined to a desired shape.

The fugitive filler material may be polyethylene spheres, polymethylmethacrylate etc, for example. Other suitable organic filler materials such as, polystyrene, may alternatively be used.

The fugitive first binder material may be an organic compound such as methyl cellulose, for example, which may be mixed with warm water to enable a mixture of dough-like consistency to be produced for subsequent moulding.

The second binder material may be silica sol, for example, and is present to provide a medium for interparticle bonding in the body prior to infiltration with a metal matrix.

The porous ceramic body may be used in applications without further processing. Such applications may include insulating bricks, catalyst supports and gas or liquid filters. The degree of porosity may be controlled by means of the particle size and quantity of the fugitive filler material.

According to a second aspect of the present invention there is provided a porous ceramic body when made by the first aspect.

According to a third aspect of the present invention there is provided a method of making a reinforced metallic article by infiltration of a body according to the second aspect with a molten metal.

In one embodiment of the third aspect the molten metal may be an aluminium alloy such as one from the well known 2000, 6000, or 7000 series of aluminium alloys.

According to a fourth aspect of the present invention there is provided a reinforced metallic article when made by the third aspect.

The infiltrated body may, if desired, be worked by, for example, forging, extrusion or any other appropriate processes for the manufacture of wrought materials. Where the infiltrated material is to be worked, the heating step during production of the interparticle bonds in the porous body may be only sufficient to allow the porous body to be handled and infiltrated without significant effect on the shape or volume, for example. Subsequent working will, therefore, allow the complete rupture of the interparticle bonds.

In order that the present invention may be more fully understood examples will now be described by ay of illustration only.

EXAMPLE 1

A porous ceramic body was prepared using the following procedure. A mixture was made of 38 gm. of commercial silicon powder having an 11 micrometre particle size, 75 gm. of polyethylene spheres of about 450 micrometres diameter, 5.5 gm. of aqueous silica sol and sufficient aqueous methyl cellulose solution to allow the whole mixture to be worked into a paste of dough-like consistency. A cylindrical mould was filled with the resulting paste using hand pressure, the filled mould then being dried at 90° C. to drive off the water. The dried compact was removed from the mould and heated in a vacuum furnace over a period of 5 hours to a temperature of 500° C. under an argon atmosphere. It was held at 500° C. for 2 hours then heated at a rate of 100° C./hour to 1020° C. where it was maintained for 5 hours and then allowed to cool to room temperature in the surface.

At this stage the body is saturated with carbon from the methyl cellulose and polyethylene which has been decomposed. The body is now amenable to shaping prior to further heat treatment.

The body was then passed through a cycle commonly used for the nitriding of silicon, during which cycle, due to the presence of carbon, the silicon converted to silicon carbide. The cycle comprised raising the temperature of the body to approximately 1430° C. under a nitrogen atmosphere.

EXAMPLE 2

A body of silicon particles was prepared as in Example 1. The heat treatment at 500° C. and 1020° C., however, was in air rather than argon. The effect of this was to burn off the polyethylene and methyl cellulose leaving an essentially carbon free body. During the resulting heating cycle under the nitrogen atmosphere the silicon particles were converted to silicon nitride.

Samples of both silicon carbide and silicon nitride bodies were infiltrated with an aluminium-silicon alloy by squeeze casting. The bodies were pre-heated to between 600° C. and 800° C. and molten metal at about 720° C. was poured onto the bodies in the squeeze casting die. The squeeze casting pressure was about 124 MPa.

The resulting infiltrated bodies consisted of about 25% by volume particulate reinforcement.

As stated above the porous bodies so produced may be used in applications without infiltration of a metal matrix. The bodies may be shaped, prior to conversion to silicon nitride or carbide, to suit them to their intended application in, for example, insulating bricks, catalyst supports or filters.

We claim:

1. A method of making a reinforced metallic material, the method comprising the steps of producing a porous silicon body by mixing a desired proportion of particulate or short fibre silicon with a desired proportion of a fugitive filler material, a liquid fugitive first binder material and a second binder material, filling a mould with the mixture, heating the mixture for a period of time at less that 100° C. to dry the mixture, heating the dried mixture to burn off said fugitive filler material to produce voids and to form bonds between said particles or short fibres of silicon with said second binder material and thus form a porous silicon body, converting said porous silicon body to either a silicon nitride or a silicon carbide porous ceramic body by heating under an appropriate gas atmosphere, and infiltrating said porous ceramic body with a molten metal.

2. A method according to claim 1 further comprising shaping said porous silicon body.

3. A method according to claim 1 wherein said fugitive filler material is selected from the group consisting of poyethylene, polystyrene and polymethylmethacrylate.

4. A method according to claim 1 wherein said fugitive first binder material comprises methyl cellulose.

5. A method according to claim 1 wherein said second binder material is colloidal silica.

6. A method according to calim 1 wherein the molten metal is an aluminium alloy.

7. A method according to claim 6 wherein the aluminium alloy is selected from the group consisting of the 2000, 6000 and 7000 series of aluminium alloys.

8. A method according to claim 1 wherein the infiltration step is by squeeze casting.

9. A method according to claim 1 wherein the infiltrated porous ceramic body is subsequently wrought.

10. A method of making a reinforced metallic material, comprising the steps of producing a porous silicon body by forming a mixture consisting essentially of a desired proportion of particulate or short fibre silicon with a desired proportion of a fugitive filler material, a liquid fugitive first binder material and a second binder material, filling a mould with the mixture, heating the mixture for a period of time at less than 100° C. to dry the mixture, heating the dried mixture to burn off said fugitive filler material to produce voids and to form bonds between said particles or short fibres of silicon with said second binder material and thus form a porous silicon body, converting said porous silicon body to either a silicon nitride or a silicon carbide porous ceramic body by heating under an appropriate gas atmosphere, and infiltrating said porous ceramic body with a molten metal.

* * * * *